United States Patent
Suenaga

(10) Patent No.: US 10,324,660 B2
(45) Date of Patent: Jun. 18, 2019

(54) DETERMINING WHETHER TO COMPRESS DATA PRIOR TO STORAGE THEREOF

(71) Applicant: NEC Corporation, Minato-ku, Tokyo (JP)

(72) Inventor: Masaya Suenaga, Tokyo (JP)

(73) Assignee: NEC CORPORATION, Tokyo (JP)

(*) Notice: Subject to any disclaimer, the term of this patent is extended or adjusted under 35 U.S.C. 154(b) by 24 days.

(21) Appl. No.: 15/455,296

(22) Filed: Mar. 10, 2017

(65) Prior Publication Data

US 2017/0277475 A1 Sep. 28, 2017

(30) Foreign Application Priority Data

Mar. 25, 2016 (JP) .................................. 2016-061473

(51) Int. Cl.
*G06F 3/06* (2006.01)
*G06F 11/30* (2006.01)
*G06F 12/02* (2006.01)

(52) U.S. Cl.
CPC ............ *G06F 3/0661* (2013.01); *G06F 3/061* (2013.01); *G06F 3/0608* (2013.01); *G06F 3/0647* (2013.01); *G06F 3/0659* (2013.01); *G06F 3/0679* (2013.01); *G06F 3/0688* (2013.01); *G06F 3/0689* (2013.01); *G06F 11/3024* (2013.01); *G06F 12/0246* (2013.01); *G06F 2212/401* (2013.01)

(58) Field of Classification Search
CPC ......... G06F 3/0608; G06F 11/30–3062; G06F 2212/401
See application file for complete search history.

(56) References Cited

U.S. PATENT DOCUMENTS

| | | | | |
|---|---|---|---|---|
| 5,276,898 A | * | 1/1994 | Kiel | ................... G06F 11/3409 358/1.9 |
| 9,703,496 B2 | * | 7/2017 | Satou | ................... G06F 3/0616 |
| 10,157,006 B1 | * | 12/2018 | Armangau | ............ G06F 3/0619 |
| 2005/0015374 A1 | * | 1/2005 | Reinauer | ............. G06F 12/0868 |
| 2009/0006728 A1 | * | 1/2009 | Green | ................... G06F 9/4418 711/104 |

(Continued)

FOREIGN PATENT DOCUMENTS

| | | |
|---|---|---|
| JP | 2012-505440 A | 3/2012 |
| WO | 2010/097960 A1 | 9/2010 |
| WO | 2012/124100 A1 | 9/2012 |

OTHER PUBLICATIONS

Jacob et al. Memory Systems: Cache, Dram, Disk. 2008. Elsevier. pp. 763-765.*

(Continued)

*Primary Examiner* — Nathan Sadler

(57) ABSTRACT

A control device 1 includes, as function units, a compression propriety determination unit 2 and a transfer unit 3. The compression propriety determination unit 2 determines whether to compress writing-target data based on a compression condition including an operating state of the device. The transfer unit 3 transfers data acquired by compressing the writing-target data to a storage storing data when it is determined to compress the writing-target data. The transfer unit 3 transfers the writing-target data to the storage without compressing when it is determined not to compress the writing-target data.

6 Claims, 5 Drawing Sheets

| LOGICAL DISK NUMBER | AVERAGE COMPRESSION RATE | AVERAGE RESPONSE TIME | COMPRESSION TIME |
|---|---|---|---|
| | | | |
| | | | |
| | | | |

(56) References Cited

U.S. PATENT DOCUMENTS

| | | | |
|---|---|---|---|
| 2011/0238914 A1 | 9/2011 | Hirayama | |
| 2014/0013068 A1* | 1/2014 | Yamato | G06F 3/0608 |
| | | | 711/154 |
| 2014/0372715 A1* | 12/2014 | Bak | G06F 12/126 |
| | | | 711/158 |
| 2016/0246512 A1* | 8/2016 | Li | G06F 17/30289 |
| 2017/0123704 A1* | 5/2017 | Sharma | G06F 3/0626 |

OTHER PUBLICATIONS

Jeannot et al. "Adaptive Online Data Compression." 2002. IEEE. HPDC-11.*
Japanese Office Action for JP Application No. 2016-061473 dated Apr. 24, 2018 with English Translation.
Japanese Office Action for JP Application No. 2016-061473 dated Apr. 9, 2019 with English Translation.

* cited by examiner

Fig. 4

| WHETHER OR NOT COMPRESSED | CACHE ADDRESS | ADDRESS OF PHYSICAL DISK | SIZE |
|---|---|---|---|
| | | | |
| | | | |
| | | | |

Fig. 5

| LOGICAL DISK NUMBER | AVERAGE COMPRESSION RATE | AVERAGE RESPONSE TIME | COMPRESSION TIME |
|---|---|---|---|
| | | | |
| | | | |
| | | | | though not included, may be found in a parent of this application.

DETERMINING WHETHER TO COMPRESS DATA PRIOR TO STORAGE THEREOF

This application is based upon and claims the benefit of priority from Japanese Patent Application No. 2016-061473, filed on Mar. 25, 2016, the disclosure of which is incorporated herein in its entirety by reference.

TECHNICAL FIELD

The present invention relates to a technique related to compression of data to be stored in a storage device.

BACKGROUND ART

Storing more data in a storage device is desired. Means using the storage device whose capacity is large can increase a quantity of data storable in the storage device. On the other hand, if the storage device having a large storage capacity is large in size and expensive, it sometimes does not meet needs of a user. For this reason, as a technique of storing more data in the storage device without increasing a size of the storage device, a technique of compressing data is provided.

The reference literature 1 (WO 2012/124100 A1) discloses a technique in which, when writing data in the storage device, a process taking shorter processing time, which is selected out of a process of compressing writing-target data and then writing the data in the storage device and a process of writing data in the storage device without compressing the data, is performed to write the data.

SUMMARY

For example, as one of methods of compressing data, provided is a method of compressing data in a unit of a data block also called a page. When compressing data in the unit of the page, the compression rate and the processing time taken for the compression process vary depending on types of compressing-target data. Due to the variation, it is difficult to predict the compression rate of the data after the compression and the processing time, before the compression process. Consequently, when the process of compressing data is performed, a central processing unit (CPU), e.g., performing the process becomes highly loaded, which cause to generate a response delay problem that a response from a storage device to a host computer connected to the storage device is delayed.

In order to solve the above-described problem, the present invention has been devised. In other words, a main object of the present invention is to provide a technique of preventing the response delay problem caused in the storage device by the process of compressing data.

A control device of the present invention includes a processor, the processor executes instruction to:
determine whether to compress writing-target data to be written based on a compression condition including an operating state of the device;
transfer data acquired by compressing the writing-target data to a storage storing data when it is determined to compress the writing-target data; and
transfer the writing-target data to the storage without compressing when it is determined not to compress the writing-target data.

A storage device of the present invention includes:
a storage that stores data; and
a control device that includes a processor that executes instruction to:
determine whether to compress writing-target data to be written based on a compression condition including an operating state of the device;
transfer data acquired by compressing the writing-target data to the storage storing data when it is determined to compress the writing-target data; and
transfer the writing-target data to the storage without compressing when it is determined not to compress the writing-target data.

A storage control method of the present invention includes:
determining whether to compress writing-target data to be written based on a compression condition including an operating state of the device;
transferring data acquired by compressing the writing-target data to a storage storing data when it is determined to compress the writing-target data; and
transferring the writing-target data to the storage without compressing when it is determined not to compress the writing-target data.

BRIEF DESCRIPTION OF THE DRAWINGS

Exemplary features and advantages of the present invention will become apparent from the following detailed description when taken with the accompanying drawings in which:

FIG. 4 illustrates one example of data used by the control device of the second example embodiment;

FIG. 5 illustrates one example of different data used by the control device of the second example embodiment;

EXAMPLE EMBODIMENT

The following describes example embodiments according to the present invention with reference to the drawings.

First Example Embodiment

Figure 1:
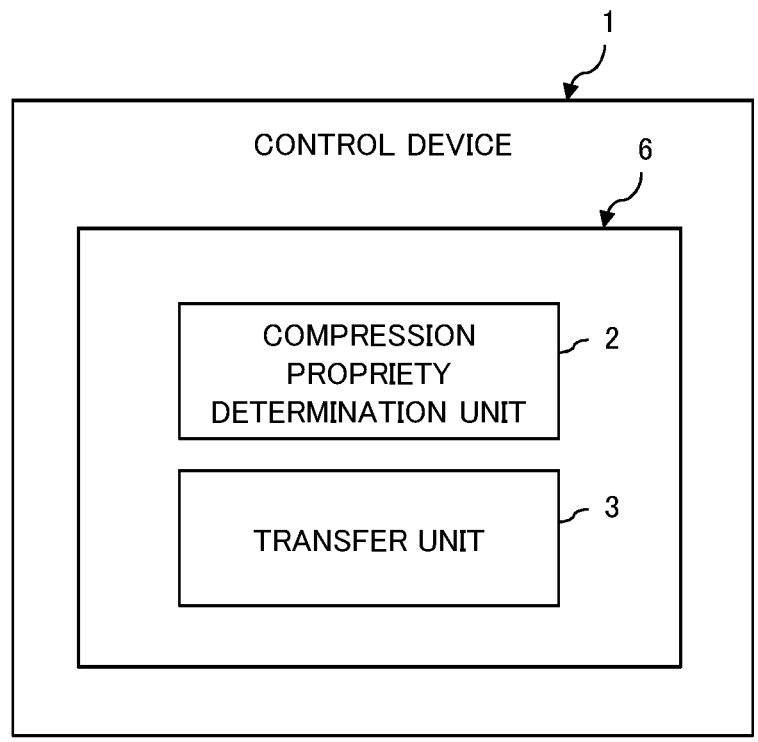
FIG. 1 is a block diagram simply illustrating a configuration of a control device of a first example embodiment according to the present invention.
Figure 2:
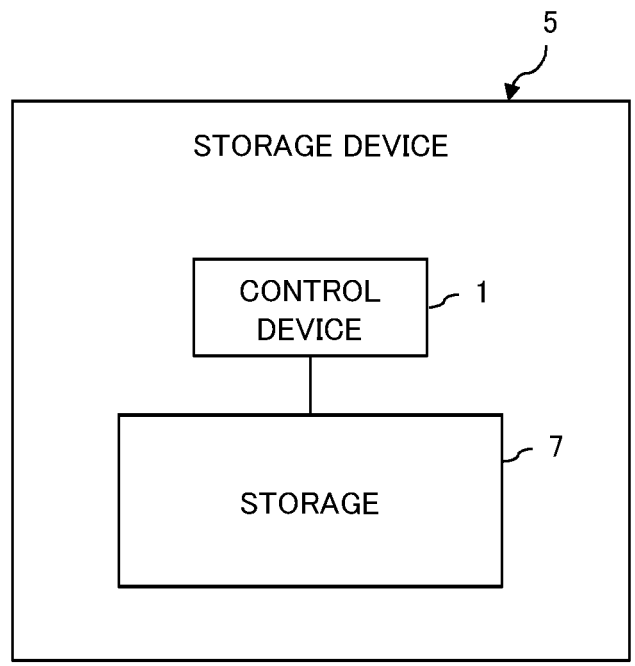
FIG. 2 is a block diagram simply illustrating a configuration of a storage device including the control device of the first example embodiment.

FIG. 1 is a block diagram simply illustrating a configuration of a control device of a first example embodiment according to the present invention. For example, the control device 1 of the first example embodiment is a device incorporated in a storage device 5 as illustrated in FIG. 2, and includes a function of controlling to write data in a storage 7 storing data.

The control device 1 includes a processor 6. The processor 6 includes, as function units, a compression propriety determination unit 2 and a transfer unit 3. The compression propriety determination unit 2 includes a function of determining whether to compress writing-target data based on a compression condition including an operating state of the device.

The transfer unit 3 includes a function of compressing the writing-target data when the determination unit 2 determines to compress the writing-target data and transferring the writing-target data compressed to the storage 7. The transfer unit 3 includes a function of transferring the writing-target data not compressed to the storage 7 when the determination unit 2 determines not to compress the writing-target data.

This control device 1 of the first example embodiment and the storage device 5 determine whether to compress the writing-target data based on the compression condition including the operating state of the device. For this reason, the writing-target data is written in the storage 7 without compressing the writing-target data when the operating state of the device is high, for example. Therefore, the control device 1 (storage device 5) prevents a situation in which processing time for the writing process becomes long. In other words, the control device 1 (storage device 5) can avoid response delay caused by compression of data.

Second Example Embodiment

Figure 3:
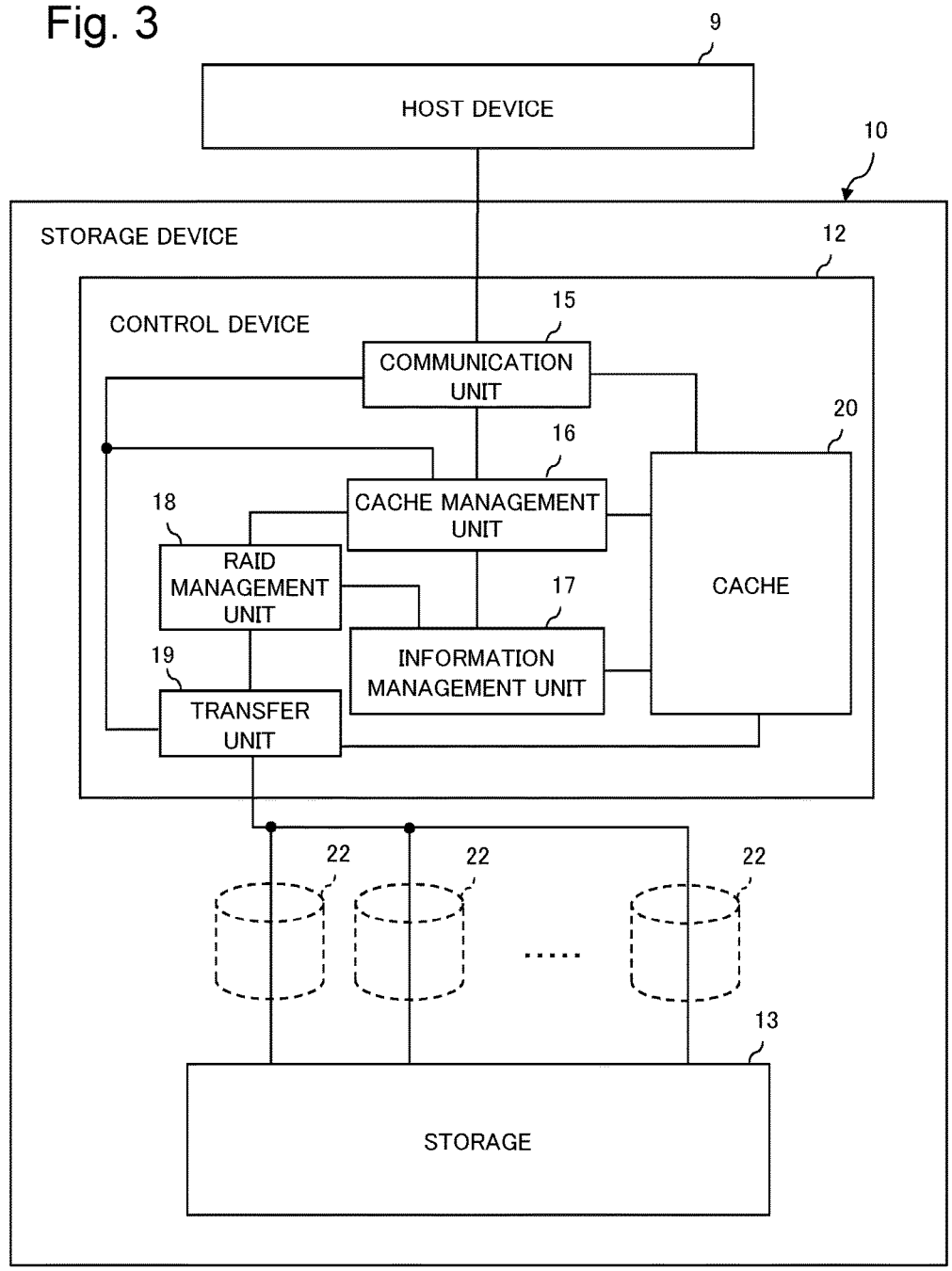
FIG. 3 is a block diagram simply illustrating a configuration of a storage device including a control device of a second example embodiment according to the present invention.

FIG. 3 simply illustrates a configuration of a storage device including a control device of a second example embodiment according to the present invention. The storage device 10 of the second example embodiment is connected to a host device (computer) 9, and performs storing and reading of data in response to a request (command) from the host device 9. In this second example embodiment, the storage device 10 is a disk array device.

The storage device 10 includes the control device 12 and a storage 13. The storage 13 is configured by a solid state drive (SSD) including flash memories as a plurality of physical disks. The control device 12 is a device that controls to write data in the storage 13 and read data from the storage 13. In this second example embodiment, a plurality of logical disks 22 are set. The control device 12 includes a function of managing relation between the logical disks 22 and the storage 13 (physical disks).

Further, the control device 12 includes a cache 20 including a function of storing data, and includes functions as follows. In other words, the control device 12 includes a central processing unit (CPU), and includes function units implemented by executing a computer program by the CPU. The function units are a communication unit 15, a cache management unit 16, an information management unit 17, a redundant arrays of inexpensive disks (RAID) management unit 18 and a transfer unit 19.

The communication unit 15 includes a function of controlling to transfer data between the host device 9 and the cache 20. Further, the communication unit 15 includes a function of writing, in the cache 20, data transmitted together with a writing request from the host device 9.

The cache management unit 16 includes a function of managing an address representing a storage position of data to be stored in the cache 20.

The RAID management unit 18 includes a function of determining the logical disk 22 that is a writing destination of the data transmitted together with the writing request from the host device 9. Further, the RAID management unit 18 includes a function of managing an address of the logical disk 22 of being the writing destination and an address (of the physical disk) in the storage 13 related thereto.

Further, the RAID management unit 18 includes a function of compressing the writing-target data relevant to a predetermined compression condition. In other words, in the second example embodiment, the RAID management unit 18 functions as a compression propriety determination unit that determines whether to compress the writing-target data based on the compression condition.

The compression condition is a condition that a busy rate (operating rate) of the CPU constituting the control device 12 is smaller than a threshold value. Further, a condition given as the compression condition is that even when the busy rate of the CPU is equal to or larger than the threshold value, when compression propriety information given to the logical disk 22 which is a writing destination of the data indicates "possible", the data is compressed.

The information management unit 17 includes a function of managing compression information as illustrated in FIG. 4 and compression-related information as illustrated in FIG. 5. The compression information is information in which information of whether data stored in the cache 20 is compressed data, an address in the cache 20 where the data has been stored, an address of the physical disk where the data is to be stored, and a data size are related to each other. The compression-related information is information in which the logical disk number given for identifying the logical disk 22 is related to an average compression rate, average response time, and average compression time taken for a compression process, for each logical disk. The compression information and the compression-related information are stored in the cache 20.

Further, the information management unit 17 includes a function of, when data is compressed by the RAID management unit 18, updating the average compression rate and the average compression time based on information of the compression rate and the compression time taken for the compression.

Furthermore, the information management unit 17 includes a function of calculating an index expressing compression efficiency for each logical disk 22. The index is calculated as follows, for example.

Here, assuming that the average compression rate of the logical disk 22 is C, the average compression time is Tc, and the average response time is Tr. A ratio of the average compression time to the average response time for responding to a request of writing in the logical disk can be expressed by Tc/Tr (=Tc÷Tr). From this expression, regarding a process that is process responding to the writing request and is other than compression, a ratio of processing time of the process to the average response time can be expressed by 1−(Tc/Tr). Further, the index (index A) expressing compression efficiency in the logical disk 22 can be expressed by the following formula (1).

$$A = W1*C + W2*(1-(Tc/Tr)) \tag{1}$$

where, W1 and W2 are respectively weighting coefficients, and are coefficients set, for each logical disk 22, depending on which of a compression process and a different process is prioritized. Further, "*" is an arithmetic symbol expressing multiplication.

Based on the indexes A so calculated, the priority order positions in which data can be efficiently compressed can be assigned to the logical disks 22.

The transfer unit 19 includes a function of transferring data stored in the cache 20 toward the logical disk 22 (i.e., storage 13).

Figure 6:
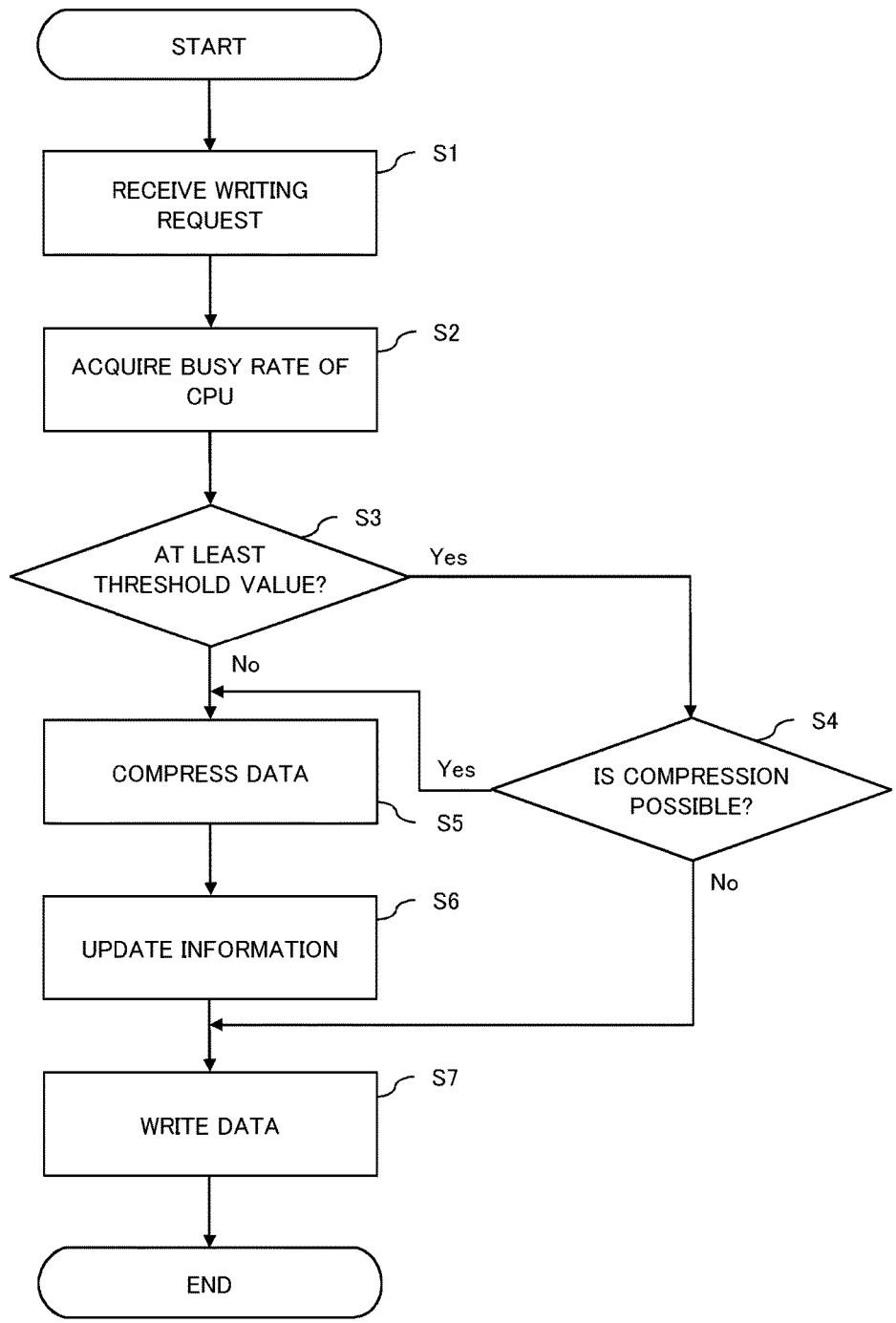
FIG. 6 is a flowchart illustrating an operation example of the control device (storage device) responding to a writing request.

The control device 12 of the second example embodiment and the storage device 10 including it are configured as described above. When the control device 12 of the storage device 10 receives the writing request from the host device 9, the control device 12 operates as follows. FIG. 6 is a flowchart illustrating an operation example of the control device 12 responding to the writing request. The flowchart drawn in FIG. 6 illustrates a process procedure performed by the control device 12.

First, when the communication unit 15 of the control device 12 receives the writing request and the writing-target data from the host device 9 (step S1 in FIG. 6), the communication unit 15 stores the writing-target data in the cache 20 and then notifies a process completion toward the host device 9.

Then, the RAID management unit 18 acquires information of the busy rate of the CPU included in the control device 12 (step S2).

Then, the RAID management unit 18 determines whether the busy rate of the CPU is equal to or larger than the threshold value (step S3). When the busy rate of the CPU is equal to or larger than the threshold value based on the information managed by the information management unit 17, the RAID management unit 18 determines whether it is possible for the logical disk 22 relevant to the writing address given to the writing-target data to be compressed (step S4).

When it is determined by this determination that compression is possible, or when the busy rate of the CPU is smaller than the threshold value, the RAID management unit 18 compresses the writing-target data in the unit of the page (the unit of the data block) (step S5). The data after the compression is stored in the cache 20.

Then, the information management unit 17 calculates the compression time taken for the compression process, and the compression rate, and updates the information of the average compression time and the average compression rate based on these calculated values. Further, based on the updated information, the information management unit 17 calculates the index A representing the compression efficiency, and updates the information of the index A (step S6). Using the indexes A can determine the priority order positions of the logical disks 22 in which compression can be performed efficiently.

Then, the transfer unit 19 reads the writing-target data from the cache 20, and writes the read data in the logical disk 22 (i.e., the storage 13) (step S7).

Then, after it is confirmed that all of the writing-target data is properly written in the logical disk (storage 13), the cache management unit 16, e.g., deletes from the cache 20 the writing-completed data that has been stored in the cache 20.

In this manner, the operation of the storage device 10 responding to the writing request is completed.

Figure 7:
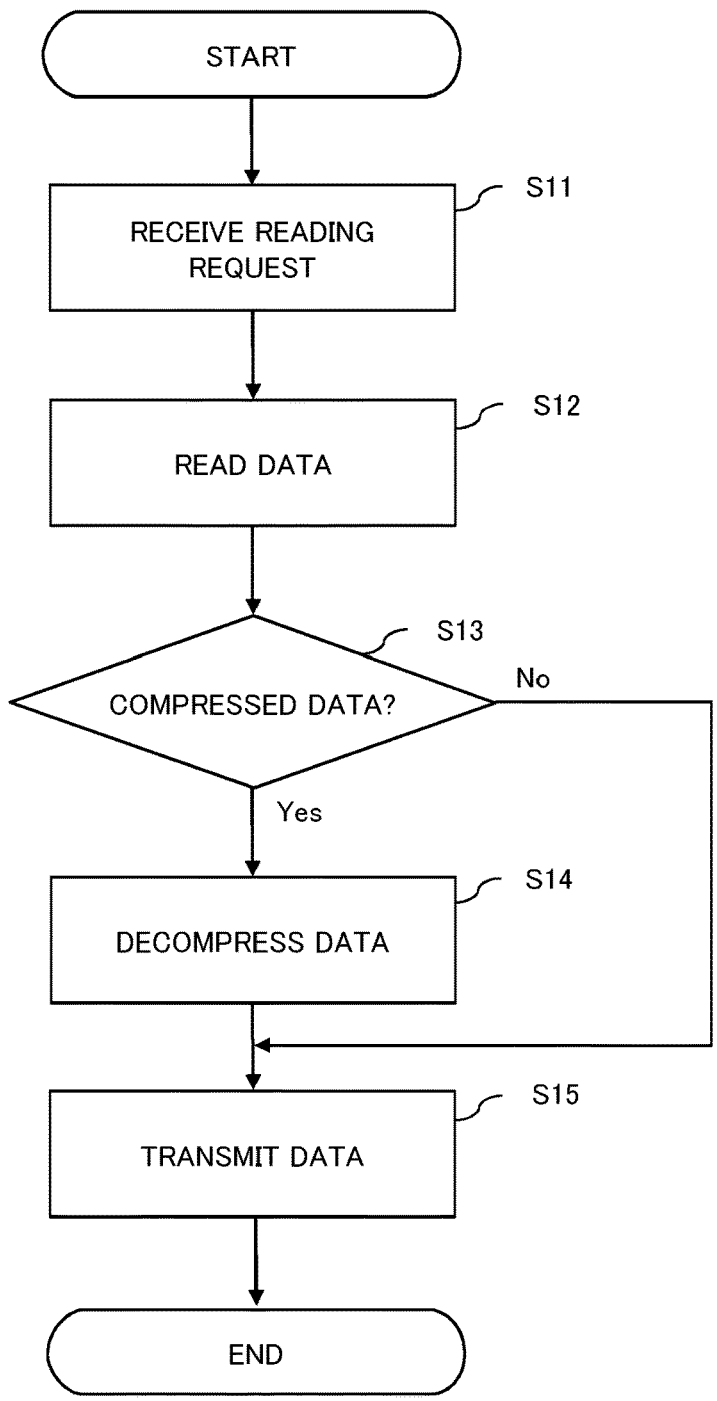
FIG. 7 is a flowchart illustrating an operation example of the control device (storage device) responding to a reading request.

Next, with reference to FIG. 7, description is made on an operation example of the control device 12 in the storage device 10 when the reading request is received from the host device 9. The flowchart drawn in FIG. 7 illustrates a process procedure performed by the control device 12.

First, when the communication unit 15 of the control device 12 receives the reading request from the host device 9 (step S11 in FIG. 7), the communication unit 15 notifies the RAID management unit 18 of the reception of the reading request. Then, the RAID management unit 18 reads data from the logical disk 22 (storage 13) based on the address information that is transmitted together with the reading request and is related to the reading-target data (step S12).

Meanwhile, the RAID management unit 18 acquires from the information management unit 17 the information of whether the read data is compressed data. Then, based on the acquired information, the RAID management unit 18 determines whether the read data is compressed data (step S13). Then, when the read data is not compressed data, the RAID management unit 18 stores in the cache 20 the read data as it is. Further, when the read data is compressed data, the RAID management unit 18 decompresses the read data (step S14), and stores in the cache 20 the data after the decompression.

Then, the communication unit 15 reads the reading-target data from the cache 20 and transmits the read data to the host device 9 (step S15). Then, after completing the transmission of the reading-target data, the communication unit 15 makes the completion notification.

In this manner, the operation of the storage device 10 responding to the reading request is completed.

In the case of writing the data in the logical disk 22 (storage device 13), the control device 12 of the second example embodiment (the storage device 10 including the control device 12) determines whether the compression is possible based on the compression condition, and compress in accordance with the determination result. In other words, when the busy rate of the CPU is smaller than the threshold value, or when the logical disk 22 as a writing target can efficiently compress the data even if the busy rate of the CPU is equal to or larger than the threshold vale, the control device 12 (storage device 10) compresses the writing-target data. For this reason, the control device 12 (storage device 10) can prevent the problem that time taken for the writing process becomes longer due to the load of the CPU excessively imposed by the compression process. In other words, the control device 12 (storage device 10) can prevent the problem that the response time from reception of the writing request from the host device 9 to notification of the writing completion to the host device 9 becomes longer.

Further, in the second example embodiment, although the writing-target data is compressed to be written in the storage 13 in a randomly accessing condition, the control device 12 (storage device 10) can avoid the response delay since the storage 13 is configured by the SSD that does not delay the response even in the random access.

Furthermore, the control device 12 (storage device 10) of the second example embodiment includes the configuration continuing to update the statistical information such as the compression rate and the compression time concerning compression, and thereby, can continue to improve reliability in the compression process.

Other Example Embodiments

The present invention can adopt various configurations for implementation without limitation to the first and second example embodiments. For example, the storage 13 (i.e., physical disks) is configured by the SSD in the second example embodiment, but may be configured by a different storage medium such as a hard disk (magnetic disk).

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The whole or part of the example embodiments disclosed above can be described as, but not limited to, the following supplementary notes.

Supplementary Note 1

A control device includes:
a compression propriety determination unit that determines whether to compress writing-target data to be written based on a compression condition including an operating state of the device; and
a transfer unit that transfers data acquired by compressing the writing-target data to a storage storing data when it is determined to compress the writing-target data, and transfers the writing-target data to the storage without compressing when it is determined not to compress the writing-target data.

Supplementary Note 2

In the control device according to the Supplementary Note 1, a plurality of logical disks related to the storage are set,
the compression propriety determination unit includes a function of calculating a priority order position in a compression process based on compression-related information including compression time concerning the compression process of each of the logical disks, and
the compression condition is a condition that the writing-target data is compressed when an operating rate of the device is smaller than a threshold value, or the priority order position of the logical disk of being a destination to be written the writing-target data is equal to or higher than a predetermined priority order position even if the operating rate is equal to or larger than the threshold value.

Supplementary Note 3

The control device according to the Supplementary Note 1 or 2 further includes an information management unit that updates, as the compression-related information, statistical information including compression time concerning the compression process.

Supplementary Note 4

A storage device includes:
a storage that stores data; and
a control device that includes a compression propriety determination unit that determines whether to compress writing-target data to be written based on a compression condition including an operating state of the device; and a transfer unit that transfers data acquired by compressing the writing-target data to the storage storing data when it is determined to compress the writing-target data, and transfers the writing-target data to the storage without compressing when it is determined not to compress the writing-target data.

Supplementary Note 5

In the storage device according to the Supplementary Note 4, the storage is configured by a solid state drive (SSD).

Supplementary Note 6

In the storage device according to the Supplementary Note 4 or 5, the storage is configured by a plurality of storage mediums, and
the storage device is a disk array device in which the plurality of storage mediums operate virtually as one storage medium.

Supplementary Note 7

A storage control method includes:
determining whether to compress writing-target data to be written based on a compression condition including an operating state of the device;
transferring data acquired by compressing the writing-target data to a storage storing data when it is determined to compress the writing-target data; and
transferring the writing-target data to the storage without compressing when it is determined not to compress the writing-target data.

Supplementary Note 8

A non-transitory program storage medium storing a computer program that represents a process procedure causing a computer to execute:
determining whether to compress writing-target data to be written based on a compression condition including an operating state of the device; and
transferring data acquired by compressing the writing-target data to a storage storing data when it is determined to compress the writing-target data, and transferring the writing-target data to the storage without compressing when it is determined not to compress the writing-target data.

The invention claimed is:
1. A storage control method comprising:
determining whether to compress writing-target data to be written in a storage based on a compression condition, the storage being a storage in which a plurality of logical disks are set, the compression condition being to satisfy a condition that a busy rate of the processor is smaller than a threshold value or to satisfy a condition that, even when the busy rate is not smaller than the threshold value, information associated with the logical disk in which the writing-target data is written represents that it is possible to compress data;
transferring data acquired by compressing the writing-target data to one of the plurality of logical disks when it is determined to compress the writing-target data due to the satisfaction of the compression condition;
transferring the writing-target data to one of the plurality of logical disks without compressing when it is determined not to compress the writing-target data;
after compressing the writing-target data, using statistical information that is stored in a cache and includes average compression time and is associated with the logical disk to which the compressed writing-target data is transferred, calculate the statistical information for updating; and
write the calculated statistical information for updating into the cache.

2. A control device comprising a processor,
the processor executes instruction to:
determine whether to compress writing-target data to be written in a storage based on a compression condition, the storage being a storage in which a plurality of logical disks are set, the compression condition being to satisfy a condition that a busy rate of the processor is smaller than a threshold value or to satisfy a condition that, even when the busy rate is not smaller than the threshold value, information associated with the logical disk in which the writing-target data is written represents that it is possible to compress data;
transfer data acquired by compressing the writing-target data to one of the plurality of logical disks when it is determined to compress the writing-target data due to the satisfaction of the compression condition;
transfer the writing-target data to one of the plurality of logical disks without compressing when it is determined not to compress the writing-target data;
after compressing the writing-target data, using statistical information that is stored in a cache and includes average compression time and is associated with the logical disk to which the compressed writing-target data is transferred, calculate the statistical information for updating; and
write the calculated statistical information for updating into the cache.

3. The control device according to claim 2, wherein the processor calculates a priority order position in a compression process based on compression-related information including compression time concerning the compression process of each of the logical disks.

4. A storage device comprising:
a storage that stores data and in which a plurality of logical disks are set; and
a control device that includes a processor that executes instruction to:
determine whether to compress writing-target data to be written in the storage based on a compression condition, the compression condition being to satisfy a condition that a busy rate of the processor is smaller than a threshold value or to satisfy a condition that, even when the busy rate is not smaller than the threshold value, information associated with the logical disk in which the writing-target data is written represents that it is possible to compress data;
transfer data acquired by compressing the writing-target data to one of the plurality of logical disks when it is determined to compress the writing-target data due to the satisfaction of the compression condition;
transfer the writing-target data to one of the plurality of logical disks without compressing when it is determined not to compress the writing-target data;
after compressing the writing-target data, using statistical information that is stored in a cache and includes average compression time and is associated with the logical disk to which the compressed writing-target data is transferred, calculate the statistical information for updating; and
write the calculated statistical information for updating into the cache.

5. The storage device according to claim 4, wherein the storage is configured by a solid state drive (SSD).

6. The storage device according to claim 4, wherein the storage is configured by a plurality of storage mediums, and the storage device is a disk array device in which the plurality of storage mediums operate virtually as one storage medium.

* * * * *